US012555696B2

(12) United States Patent
Pegg et al.

(10) Patent No.: US 12,555,696 B2
(45) Date of Patent: Feb. 17, 2026

(54) METHODS FOR REMOVING IODATE FROM AQUEOUS SOLUTIONS

(71) Applicant: The Catholic University of America, Washington, DC (US)

(72) Inventors: Ian L. Pegg, Alexandria, VA (US); Miguel Penafiel, Kensington, MD (US)

(73) Assignee: The Catholic University of America, Washington, DC (US)

( * ) Notice: Subject to any disclaimer, the term of this patent is extended or adjusted under 35 U.S.C. 154(b) by 73 days.

(21) Appl. No.: 17/540,332

(22) Filed: Dec. 2, 2021

(65) Prior Publication Data

US 2022/0199274 A1 Jun. 23, 2022

Related U.S. Application Data

(60) Provisional application No. 63/127,303, filed on Dec. 18, 2020.

(51) Int. Cl.
| | |
|---|---|
| *G21F 9/06* | (2006.01) |
| *B01J 41/02* | (2006.01) |
| *B01J 41/07* | (2017.01) |
| *B01J 41/10* | (2006.01) |
| *B01J 41/14* | (2006.01) |
| *C02F 1/42* | (2023.01) |
| *C02F 101/12* | (2006.01) |
| *G21F 9/12* | (2006.01) |

(52) U.S. Cl.
CPC ............ *G21F 9/06* (2013.01); *B01J 41/02* (2013.01); *B01J 41/07* (2017.01); *B01J 41/10* (2013.01); *B01J 41/14* (2013.01); *G21F 9/12* (2013.01); *C02F 2001/422* (2013.01); *C02F 2101/12* (2013.01)

(58) Field of Classification Search
CPC .. C01B 7/135; C01B 9/06; C01B 7/14; C01B 7/13; C01D 3/12; C01D 3/14; C01D 3/145
See application file for complete search history.

(56) References Cited

U.S. PATENT DOCUMENTS

| | | | |
|---|---|---|---|
| 5,220,058 A | 6/1993 | Fish et al. | |
| 5,338,444 A * | 8/1994 | van Buren | B01J 20/265 210/660 |
| 6,939,569 B1 | 9/2005 | Green et al. | |
| 2002/0081662 A1 | 6/2002 | Simon et al. | |
| 2013/0118968 A1* | 5/2013 | Yamada | C07F 19/005 556/27 |
| 2013/0186761 A1 | 7/2013 | Van Der Wal et al. | |
| 2014/0138296 A1* | 5/2014 | Sekiguchi | B01J 20/22 210/96.1 |

FOREIGN PATENT DOCUMENTS

| | | |
|---|---|---|
| CN | 1 039 990 C | 9/1998 |
| CN | 107 159 141 A | 9/2017 |
| CN | 107 226 507 A | 10/2017 |
| CN | 110 152 615 A | 8/2019 |
| JP | S 57-162643 A | 10/1982 |
| JP | 6090089 A * | 5/1985 |
| JP | H 5-317697 A | 12/1993 |
| JP | 6-157008 A | 6/1994 |
| JP | 2010-270368 A | 12/2010 |
| JP | 2012250198 A * | 12/2012 |
| JP | 2013-103213 A | 5/2013 |
| JP | 2014-510626 A | 5/2014 |
| JP | 2017-90131 A | 5/2017 |
| JP | 6-334140 A | 5/2018 |
| KR | 10-2000-0008867 A | 2/2000 |
| WO | 2012/122022 A1 | 9/2012 |

OTHER PUBLICATIONS

Hird, F. J. R., and J. R. Yates. "The oxidation of cysteine, glutathione and thioglycollate by iodate, bromate, persulphate and air." Journal of the Science of Food and Agriculture 12.2 (1961): 89-95 (Year: 1961).*
The United States Pharmacopeial Convention. (2015). Dietary Supplements Compendium 2015, vol. 1 and 2—Cystine. The U.S. Pharmacopeia (USP). Retrieved from https://app.knovel.com/hotlink/pdf/id:kt00UC0RX6/dietary-supplements-compendium/cystine (retrieved on Apr. 26, 2023) (Year: 2015).*
Amberlite Product Data Sheet (Form No. 45-D01234-en, Rev. Dec. 1, 2019) (Year: 2019).*
Machine generated translation of JP-6090089-A (Year: 1985).*
Machine generated translation of JP-2012250198-A (Year: 2012).*
Nam, K. H., and L. L. Tavlarides. "Mercury Removal from Acidic Waste Solutions Using a Thiol Functional Organo-ceramic Adsorbent." Solvent extraction and ion exchange 21.6 (2003): 899-913. (Year: 2003).*
Water on the Web "pH Why Is It Important?" Jan. 17, 2008 (https://www.waterontheweb.org/under/waterquality/ph.html) (Year: 2008).*
International Atomic Energy Agency, "Handling and Processing of Radioactive Waste from Nuclear Applications" (2001) (https://www-pub.iaea.org/MTCD/Publications/PDF/TRS402_scr.pdf) (Year: 2001).*
Rohm and Haas Product Data Sheet for Amberlite IRA 458 FR CI (Year: 2017).*
Search Report and Written Opinion received in PCT Application No. PCT/IB2021/061315 mailed Feb. 11, 2022.
European Extended Search Report received in EP Application No. 21905918.5 dated Mar. 11, 2024.
Official Action received in Japanese Application No. 2023-536905 dated Jul. 15, 2025.

* cited by examiner

*Primary Examiner* — Magali P Slawski
*Assistant Examiner* — Bernadette Karen McGann
(74) *Attorney, Agent, or Firm* — Ajay A. Jagtiani; Miles & Stockbridge P.C.

(57) ABSTRACT

Methods and materials are described for the removal of iodate from aqueous solutions. The methods comprise reduction of the iodate to iodide and subsequent or concurrent removal of the iodide by sorption, ion exchange, or precipitation. These methods are effective for the removal of radioactive iodine from radioactive and nuclear wastes.

13 Claims, No Drawings

METHODS FOR REMOVING IODATE FROM AQUEOUS SOLUTIONS

CROSS-REFERENCE TO RELATED APPLICATIONS

This application claims benefit of priority of U.S. Provisional Patent Application No. 63/127,303, entitled "METHODS FOR REMOVING IODATE FROM AQUEOUS SOLUTIONS," filed Dec. 18, 2020. The entire contents and disclosures of these patent applications are incorporated herein by reference in their entirety.

BACKGROUND

Field of the Invention

The present invention relates to methods for the removal of iodate from aqueous solutions by the conversion of iodate to iodide and the subsequent or concurrent removal of iodide by sorption, ion exchange, or precipitation. An important application for this invention pertains to the clean-up of liquid wastes streams that contain radioactive iodine, some of which may be present as iodate. Such wastes include, in particular, liquid wastes generated from nuclear reactor operations and from reprocessing of spent nuclear fuel.

Background of the Invention

The radioactive isotope of iodine $^{129}I$ is formed by fission of uranium and plutonium in nuclear reactors and it is therefore present in many types of nuclear wastes. $^{129}I$ is a beta emitter with a half-life of 15.7 million years. Since iodine forms very soluble anions such as iodide and iodate, it is highly mobile in the environment. The very long half-life and high environmental mobility coupled with the biological activity of iodine, particularly in the thyroid, make $^{129}I$ a significant environmental risk factor in the performance assessment of repositories for nuclear waste disposal since the presence of radioactive iodine in the environment poses a risk to the ecosystem in general and to human health.

The chemical forms of iodine in radioactive liquid wastes typically include iodide and iodate and these are often the predominant forms. There are many effective options for removal of iodide, such as ion exchange with strong-base anion exchangers, precipitation as silver iodide, sorption on silver impregnated media such as silver zeolites, and sorption by cerium-, bismuth-, or iron-based media. In contrast, however, there are few effective options for the removal of iodate. Consequently, the overall ability to remove radioactive iodine from a waste stream can be limited by the amount of iodine that is present as iodate. The present invention addresses that need by teaching effective methods for the removal of iodine that is present in the form of iodate.

SUMMARY

According to a first broad aspect, the present disclosure provides a method for the removal of iodate from aqueous liquids comprising adding a water-soluble compound containing thiol groups and removing iodide, wherein the thiol groups can convert iodate to iodide.

According to a second broad aspect, the present disclosure provides a material for converting iodate in aqueous solution to iodide, comprising a solid substrate to which a thiol group containing compound is attached.

According to a second broad aspect, the present disclosure provides method for the removal of iodate from aqueous liquids using a material for converting iodate in aqueous solution to iodide, comprising a solid substrate to which a thiol group containing compound is attached Other applications of this invention will become apparent to those skilled in the art from the description provided herein.

DETAILED DESCRIPTION OF THE INVENTION

Definitions

Where the definition of terms departs from the commonly used meaning of the term, applicant intends to utilize the definitions provided below, unless specifically indicated.

It is to be understood that the foregoing general description and the following detailed description are exemplary and explanatory only and are not restrictive of any subject matter claimed. In this application, the use of the singular includes the plural unless specifically stated otherwise. It must be noted that, as used in the specification and the appended claims, the singular forms "a," "an" and "the" include plural referents unless the context clearly dictates otherwise. In this application, the use of "or" means "and/or" unless stated otherwise. Furthermore, use of the term "including" as well as other forms, such as "include", "includes," and "included," is not limiting.

For purposes of the present disclosure, the term "comprising", the term "having", the term "including," and variations of these words are intended to be open-ended and mean that there may be additional elements other than the listed elements.

For purposes of the present disclosure, directional terms such as "top," "bottom," "upper," "lower," "above," "below," "left," "right," "horizontal," "vertical," "up," "down," etc., are used merely for convenience in describing the various embodiments of the present disclosure. The embodiments of the present disclosure may be oriented in various ways. For example, the diagrams, apparatuses, etc., shown in the drawing figures may be flipped over, rotated by 90° in any direction, reversed, etc.

For purposes of the present disclosure, a value or property is "based" on a particular value, property, the satisfaction of a condition, or other factor, if that value is derived by performing a mathematical calculation or logical decision using that value, property or other factor.

For purposes of the present disclosure, it should be noted that to provide a more concise description, some of the quantitative expressions given herein are not qualified with the term "about." It is understood that whether the term "about" is used explicitly or not, every quantity given herein is meant to refer to the actual given value, and it is also meant to refer to the approximation to such given value that would reasonably be inferred based on the ordinary skill in the art, including approximations due to the experimental and/or measurement conditions for such given value.

For purposes of the present disclosure, the term "organosulfur compounds" refers to organic compounds that contain sulfur. In the present disclosure, this term refers to sulfur containing organic compounds with at least one thiol functional group that can be represented by a general formula $R—(SH)_n$.

For purposes of the present disclosure, the term "stoichiometry" refers to the relationship between the quantities of reactants and products before, during, and following chemical reactions.

For purposes of the present disclosure, the terms "media", "substrate" and "resin" are used interchangeably. The term "media" refers to an organic or inorganic solid ion exchange material consisting of a "substrate" with pendant chemical moieties that may participate in chemical reactions while retaining the integrity of the substrate. The ion exchange media may be an organic polymeric "resin." In this context, the terms "media", "substrate" and "resin" refer to the solid matrix which is the backbone for the attachment of chemical moieties, for instance thiol functional groups, that can participate in ion exchange and other chemical reactions.

Description

While the invention is susceptible to various modifications and alternative forms, specific embodiment thereof has been shown by way of example in the drawings and will be described in detail below. It should be understood, however that it is not intended to limit the invention to the particular forms disclosed, but on the contrary, the invention is to cover all modifications, equivalents, and alternatives falling within the spirit and the scope of the invention.

The speciation of iodine dissolved in aqueous solutions depends on the concentrations of other dissolved constituents and other characteristics such as the solution pH and oxidation-reduction (redox) state. Common forms of iodine dissolved in aqueous solutions include iodide (I−), iodate ($IO_3^-$), molecular iodide ($I_2$), and triiodide ($I_3^-$). The predominant forms of iodine in radioactive liquid wastes from nuclear sources are typically iodide and iodate.

The removal of iodine that is present in aqueous solutions as iodide can be effectively accomplished by various methods including ion exchange with strong-base anion exchangers, other ion exchangers, precipitation as silver iodide, sorption on silver impregnated media such as silver zeolites, or sorption by cerium-, bismuth-, or iron-based media. In contrast, however, there are few effective options for removal of iodate. For example, many ion exchange media that are effective for iodide removal are orders of magnitude less effective for iodate removal. Similarly, whereas silver iodide has a solubility in water at room temperature of about $3 \times 10^{-8}$ g/L, the solubility of silver iodate in water at room temperature is more than 100,000 time greater. Consequently, whereas iodide can be removed very effectively by precipitation as silver iodide by, for example, adding silver nitrate, iodate cannot readily be removed by precipitation.

In one embodiment, the present disclosure describes a novel method for iodate removal from aqueous streams by first reducing iodine in the form of iodate to iodide. Once iodate is converted to iodide, it can be easily removed by ion exchange that have been shown to be effective for iodide removal.

In one embodiment, the reduction of iodate to iodide is accomplished using compounds with one or more thiol functional groups. Thiol functional groups are abundant in proteins and more specifically in the amino acid cysteine. They are also found in other organic compounds with small molecular weight, such as thioglycolic acid and thioglutathione. These organosulfur compounds have a general formula R—SH, where SH is the thiol functional group and R is the balance of the organic compound. Compounds with more than one thiol functional group, which can also be used for the reduction of iodate to iodide, may be constituted, for instance, by polymerization of R—SH compounds. In that case the polymeric compounds would be represented by the general formula R'—(SH)$_n$, where SH is the thiol functional group, R' is the polymer backbone and n is the number of thiol groups per polymer molecule. In that case n is greater than 1 and is limited by the structure of the backbone and its length.

The oxidation of organosulfur compounds that contain thiol functional groups can result in the formation of chemical entities with disulphide bonds.

In one embodiment, the stoichiometry of the reduction of iodate by the organosulfur compound represented by R—(SH)$_n$, in which n=1, may be expressed as follows:

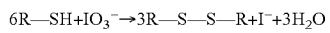

$$6R-SH+IO_3^- \rightarrow 3R-S-S-R+I^-+3H_2O$$

While this reaction in no way limits the present invention, it provides a useful and effective guide for the minimal amount of the reductant that is needed to achieve the reduction of all of the iodate present in a solution. Based on the above stoichiometry, at least six moles of R—SH are required to reduce one mole of iodate.

In one embodiment, the method for conversion of iodate to iodide and removal as iodide described in the present disclosure can be implemented as either a two-step or as a one-step process.

In another embodiment, other variations of the method for conversion of iodate to iodide and removal as iodide will be apparent to those skilled in the art. For example, after conversion of iodate to iodide, iodide can be removed by precipitation as silver iodide or by sorption on to a silver impregnated zeolite or on to a cerium-, bismuth-, or iron-containing material.

In one embodiment, iodate removal is accomplished in a two-step process. First, at least one reductant is added in the required concentration. At the end of the reduction interval, the second step of the process involves treatment to remove the iodide. In a preferred embodiment, about 8 moles of the reductant species per mole of iodate in solution provides a suitable excess over the minimum amount required described above. In a preferred embodiment, the reductant is added as an aqueous solution. In other embodiments, the reductant can also be added as a solid that is dissolved in the liquid to be treated. The reduction of iodate with the reductants described in the present disclosure proceeds quickly and is typically complete in a few minutes. With regard to the removal of iodide after the reduction process, in one embodiment, the solution can be exposed to an anion exchange medium that is effective for the removal of iodide. In a preferred embodiment, one such medium is Purolite® A532E, a gel polymer resin with a polystyrene structure crosslinked with divinylbenzene.

In another embodiment, the reductant is bound to a solid medium, which is then in contact with the iodate-containing solution to effectively reduce iodate to iodide, which is then removed as described above. The solid medium can be organic or inorganic. In a preferred embodiment, the reductant can be chemically attached to certain anion exchange resins. The reductant-treated resin is then an anion exchange resin with free thiol functional groups attached. The attached free thiol functional groups are effective in reducing iodate to iodide. In one embodiment, the reductant-treated resin may be used in combine with a strong-base resin such as Purolite® A532E that is effective for removing iodide. In another embodiment, the reductant-treated resin can be used along, when it is effective in both reducing iodate and removing iodide. In both of these embodiments, iodate removal can be accomplished in a single-step process that involves contacting the solution with either the reductant-treated media alone or in combination with a second media that is effective for iodide removal.

In one embodiment, the ion exchange resin is treated with an aqueous solution of sodium thioglycolate at room temperature for at least 12 hours. In another embodiment, the ion exchange resin is treated with other thiol-containing compounds, such as L-cysteine or sodium glutathione. In one embodiment, any process that attaches the reductant to the solid medium and leaves the thiol functional groups free is effective in creating a reductant-treated ion exchange resin that is capable of both reducing iodate and removing iodide. When an aqueous solution with dissolved iodate ions is placed in contact with the reductant-treated resin, the free thiol groups reduce the iodate to iodide, which can then be removed by any of the processes described above.

In one embodiment, the methods for iodate removal described in the present disclosure are effective over a wide range of conditions. In some preferred embodiments, some specific conditions were tested and verified, which are described in the following examples. The examples in no way limit the scope of this invention.

Having described the many embodiments of the present disclosure in detail, it will be apparent that modifications and variations are possible without departing from the scope of the invention defined in the appended claims. Furthermore, it should be appreciated that all examples in the present disclosure, while illustrating many embodiments of the invention, are provided as non-limiting examples and are, therefore, not to be taken as limiting the various aspects so illustrated.

EXAMPLES

Example 1

Verification of the Two-Step Iodine Removal Method

The effectiveness of employing the two-step method described in the present disclosure for the removal of iodate was experimentally verified using a solution that simulates the chemical composition of a low level radioactive aqueous waste stream containing radioactive iodine ($^{129}$I) that is projected to be produced during waste treatment and environmental clean-up operations at the U.S. Department of Energy Hanford nuclear site. The radioactive iodine in the Hanford aqueous waste is present primarily as iodide and iodate. For the purpose of this example, a chemical simulant of this waste stream was prepared with non-radioactive iodine and is hereinafter referred to as Solution 1.

For this example, Solution 1 was prepared with the following constituents and approximate concentrations: $Na^+$, $SO_4^{2-}$, and $HCO_3^-$ each about 1,500 ppm; $NH_4^+$ about 100 ppm; $Cl^-$ about 50 ppm; $NO_2^-$ about 20 ppm; $NO_3^-$ about 0.5 ppm; $K^+$, $Ca^{2+}$, $Al_3^+$, $F^-$, and $PO_4^{3-}$ each about 0.05 ppm; $Mg^{2+}$ about 0.005 ppm. Iodate was added as sodium iodate to achieve an iodine concentration of 5 ppm, which corresponds to approximately $4 \times 10^{-5}$ moles of iodate per litre of solution. The pH of this solution was adjusted to about 10.5. L-cysteine was added to Solution 1 as an approximately 0.1% aqueous solution of L-cysteine to achieve a final concentration of about $3.3 \times 10^4$ moles of cysteine per litre of solution. Using this recipe, the solution contains eight moles of thiol functional groups for each mole of iodate. The solution was mixed manually for about ten minutes and then sampled to measure the amount of iodate and iodide in the solution. Measurements by ion chromatography of the solution before and after the addition of L-cysteine showed that, within the measuring capability of the instrument, all of the iodate was reduced to iodide.

The tests were repeated after adjusting the pH of Solution 1 using sulfuric acid to each of several pH values including 10.5, 8, 7, 4, and 2. At all pH, L-cysteine was found to be equally effective in reducing all of the iodate in the solution to iodide.

The tests were also repeated using sodium thioglycolate as the reductant. Similar results were obtained when sodium thioglycolate was used in place of L-cysteine to reduce iodate to iodide. Using sodium thioglycolate as the reductant, full reduction of the iodate to iodide also accomplished with a reductant to iodate molar ratio of 8 to 1.

The effectiveness of the method described in the present disclosure of reducing iodate to iodide was also tested with a variant of Solution 1, in which the concentrations of all of the constituents, except iodate, were increased by 10 folds. The concentration of iodine as iodate was kept at 5 ppm in the tests using the variant of Solution 1. L-cysteine was used as the reductant with the same concentration as in the previous tests. Sulfuric acid was used to adjust the solution pH to each of several pH values including 10.5, 8, 7, 4, and 2. Using the variant of Solution 1, full reduction of iodate to iodide was accomplished at all pH values tested.

After conversion of iodate to iodide in the test solutions as described above, a strong base anion exchange resin was used to remove the iodide. The resin selected for this step in this example was a complex amine derivative of a styrene-divinyl benzene copolymer in the chloride form, which is sold commercially under the name A532E and trademark Purolite®. This resin is one of a number of ion exchange resin that is effective for iodide removal. The effectiveness of iodide removal in the solutions using A532E was tested by adding 0.5 grams of the resin to 10 ml of the simulant solution, including Solution 1 and variant of Solution 1 after the reduction step, which had originally 5 ppm of iodine as iodate that was subsequently reduced to iodide, as described above. The solution with the resin was mixed by continuous end-over-end tumbling for about one hour and then sampled for measurement of the concentrations of iodate and iodide by ion chromatography. In all cases, complete removal of the iodide was verified within the measuring capability of the instrument, as shown in Table 1 below. Note that in Table 1 and all Tables herein, the concentrations of iodine species (iodate or iodide) are all reported as the equivalent concentration of iodine in order to facilitate direct comparisons.

TABLE 1

Analysis by Ion Chromatography

| Starting Solution, Iodine as Iodate | | Ending Solution | |
|---|---|---|---|
| Nominal Iodine, ppm | Treatment | Measured Iodide, ppm | % Removal |
| 5.00 | Cysteine | 4.92 | |
| 5.00 | Cysteine + $H_2SO_4$ | 4.72 | |
| 5.00 | Cysteine + A532E | <detection limit | >98% |
| 5.00 | Cysteine + $H_2SO_4$ + A532E | <detection limit | >98% |
| 5.00 | Sodium thioglycolate (Na-TG) | 4.21 | |
| 5.00 | Na-TG + $H_2SO_4$ | 4.53 | |
| 5.00 | Na-TG + A532E | <detection limit | >98% |
| 5.00 | Na-TG + $H_2SO_4$ + A532E | <detection limit | >98% |

Detection limit is estimated to be about 0.1 ppm

This example verified that complete removal of iodate from solutions of complex ionic composition with a wide pH range of about 2 to 10.5 can be effectively achieved by the two-step method described in the present disclosure, which involves reduction of iodate to iodide followed by removal of iodide by ion exchange.

Example 2

Verification of the One-Step Iodine Removal Method

The effectiveness of employing the single-step method described in this invention for the removal of iodate was experimentally verified also using Solution 1 described in Example 1. In example 2, iodate was added as sodium iodate to achieve a concentration of 10 ppm iodine in solution.

The goal of this example was to use a mixed bed for the removal of iodate composed of a first resin that contains chemical groups that reduce iodate to iodide and a second resin that can remove the iodide. The iodate-reducing resin was prepared by a chemical treatment that attached thiol-containing chemical groups to the polymer beads of an anion exchange resin while maintaining the reducing capacity of the thiol functional groups. The resin used for reductant attachment was a styrene-divinyl benzene gel resin in the hydroxide form, which is sold commercially under the name MARATHON A and trademarks MARATHON® and DOWEX®. MARATHON A is presently sold under the name Amberlite HPR4800 OH. The iodide-removing resin was A532E, which was also used in Example 1.

In this example, the thiol groups were attached to the MARATHON A resin by soaking 0.5 grams of the resin in 10 ml of a 0.5% aqueous solution of sodium thioglycolate for 24 hours at room temperature or at 37° C. under continuous tumbling. The resulting material was then rinsed multiple times with equal volumes of sodium hydroxide solution with pH preferably in the range 10 to 10.5. This treatment at both room temperature and 37° C. is equally effective in attaching the thiol functional groups to the MARATHON A resin. The resulting MARATHON A resin with thiol functional groups is named as M-A_mod.

Testing was carried out using 10 ml of Solution 1 spiked with sodium iodate to achieve a concentration of 10 ppm iodine and adding about 0.4 grams of the iodate-reducing resin, prepared as described above, and 0.5 grams of the A532E resin. The solution with the mixture of resins was mixed by continuous end-over-end tumbling for about one hour and then sampled for the analysis iodine by Inductively Coupled Plasma-Mass Spectroscopy (ICPMS). ICPMS measures total iodine, regardless of speciation. The iodine concentration before the addition of resins was also measured. Complete removal of the iodine, which was originally added as iodate, was verified, as shown in Table 2 below.

TABLE 2

Analysis by ICPMS

| Starting Solution, Iodine as Iodate | | | Ending Solution | |
|---|---|---|---|---|
| Iodine, nominal ppm | Iodine, measured ppm | Treatment | Iodine, measured ppm | % Removal |
| 10 | 10.03 | M-A_mod + A532E | 0.04 | 99.6% |

This example demonstrates that complete removal of iodate from a solution of complex ionic composition can be effectively achieved by the single-step method described in the present disclosure, using a mixed bed resin composed of an anion resin with pendant thiol functional groups that reduce iodate to iodide and an anion resin that can remove iodide by ion exchange.

Example 3

Verification of the Two-Step Iodine Removal Method Removing a Mixture of Non-Radioactive and Radioactive Iodine The effectiveness of employing the two-step method described in the present disclosure for the removal of iodate from aqueous solutions was experimentally verified in a manner similar to that described in Example 1 but with solutions containing a mixture of non-radioactive and radioactive iodine. The use of radioactive iodine demonstrates the applicability of this invention to the removal of radioactive iodate even at extremely low radioactive iodine concentrations. $^{123}$I, a short-lived radioactive isotope of iodine with a 13.2-hour half-life, was used for these tests. This isotope is used in medical applications and is commercially available as an aqueous solution of sodium iodide. Since the present tests required that the iodine be present in the iodate form, the material was treated to convert the iodide to iodate. The starting solution for converting iodide to iodate was a sodium iodide solution with a ratio of stable to radioactive isotopes of at least $10^6$. The iodide in the starting solution was converted to iodate by first buffering the iodide solution with sodium acetate and acetic acid and then adding sodium chlorite in the appropriate stoichiometric ratio (6 equivalents of sodium chlorite per mole of sodium iodide). The conversion was verified by spiking Solution 1 with the converted iodate solution and then contacting the solution with Purolite® A532E for one hour. The A532E resin removes iodide from solution vastly more effectively than iodate; therefore, poor performance for iodine removal indicates that the iodine was present as iodate. In these tests about 90% of the starting radioactivity was still present at the end of the tests indicating that most, if not all, of the iodine in solution was present as iodate, as intended.

In this example, samples were prepared using 10 ml of Solution 1 spiked with the converted radioactive iodate solutions to achieve total nominal iodine concentrations of approximately 0.2 ppm and 1 ppm and nominal radioactivities of approximately 0.3 or 1.5 μCi/ml. Similar to Example 1, L-cysteine was first added to the iodate-containing solutions to reduce the iodate to iodide. Next, the solution was in contact with Purolite® A532E for one hour to remove the iodide from solution. The efficacy of iodate removal was evaluated by comparing the radio-activity in solution measured by gamma spectroscopy before and after the treatments with L-cysteine and Purolite® A532E. The iodine concentrations in the solutions before and after the treatments were also measured by ICPMS. The analyses by both the gamma spectroscopy and ICPMS yielded similar results and showed that, under the conditions described in this example, up to 85% of the iodate in solution was removed, as shown in Tables 3 and 4 below.

This example verified that substantial removal of radioactive iodate from solutions of complex ionic composition can be effectively achieved by the two-step method described in the present disclosure, which involves reduction of iodate to iodide followed by removal of iodide by ion exchange.

TABLE 3

Analysis by Gamma Spectroscopy

| Starting Solution, Iodine as Iodate | | | Ending Solution | |
|---|---|---|---|---|
| Iodine, ppm | $^{123}$I, uCi/ml | Treatment | $^{123}$I, uCi/ml | % Removal |
| 1.00 | 1.54 | Cysteine + A532E | 0.46 | 70% |
| 1.00 | 0.32 | Cysteine + A532E | 0.10 | 68% |
| 0.18 | 1.58 | Cysteine + A532E | 0.23 | 86% |

TABLE 4

Analysis by ICPMS

| Starting Solution, Iodine as Iodate | | | Ending Solution | |
|---|---|---|---|---|
| Iodine, nominal ppm | Iodine, measured ppm | Treatment | Iodine, measured ppm | % Removal |
| 1.00 | 1.03 | Cysteine + A532E | 0.27 | 74% |
| 1.00 | 1.00 | Cysteine + A532E | 0.27 | 73% |
| 0.18 | 0.19 | Cysteine + A532E | 0.02 | 88% |

Example 4

Verification of the One-Step Iodine Removal Method Removing a Mixture of Non-Radioactive and Radioactive Iodine The effectiveness of employing the single-step method described in this invention for the removal of iodate from aqueous solutions was further verified in a manner similar to that described in Example 2 but with solutions containing a mixture of non-radioactive and radioactive iodine, which is the same as in Example 3. Removal of the iodate from solution was tested using a modified version of the hydroxyl form of DOWEX®'s MARATHON A with reductant attached, which was prepared as described in Example 2.

For these tests, samples were prepared using 10 ml of Solution 1 spiked with the converted radioactive iodate solutions to achieve final nominal iodine concentrations of approximately 0.2 ppm, 1 ppm, or 10 ppm and nominal radio-activities of about 0.3 µCi/ml, 1.5 µCi/ml, or 15 µCi/ml. These tests were carried out by first adding about 0.15 grams of the modified MARATHON A resin weighed after partial moisture removal (M-A_mod-p) to each sample and tumbling end-over-end for one hour. Subsequently, samples of the solution were taken for analysis by ICPMS and gamma spectroscopy. Then, 0.1 grams of the Purolite® A532E resin was added and the mixture was tumbled end-over-end for a further one hour. After treatment with A532E resin, samples of the solution were taken for analysis by ICPMS and gamma spectroscopy. The efficacy of the treatments for iodate removal was evaluated by comparing the $^{123}$I activity levels in solution measured by gamma spectroscopy before and after the treatments. The evaluation was also carried out by comparing the pre- and post-treatment concentrations measured by ICPMS. The measurements of the solutions taken after the treatment with M-A_mod-p to show that when the modified MARATHON A resin was used alone, the iodate removal was greater than approximately 85% measured by both ICPMS and gamma spectroscopy. From the measurements of the solutions taken after the treatment with A532E, the combination of the modified MARATHON A resin and the Purolite® A532E resin demonstrated iodate removal rate of greater than 95%, as indicated by both the gamma spectroscopy and ICPMS results shown in Tables 5 and 6.

TABLE 5

Analysis by Gamma Spectroscopy

| Starting Solution, Iodine as Iodate | | | Ending Solution | |
|---|---|---|---|---|
| Iodine, nominal ppm | $^{123}$I, measured uCi/ml | Treatment | $^{123}$I, meas uCi/ml | % Removal |
| 10.00 | 15.82 | M-A_mod-p + A532E | 0.040 | 100% |
| 1.01 | 0.32 | M-A_mod-p + A532E | 0.007 | 98% |
| 1.00 | 1.54 | M-A_mod-p + A532E | 0.026 | 98% |
| 1.00 | 1.54 | M-A_mod-p | 0.201 | 87% |
| 0.18 | 1.58 | M-A_mod-p + A532E | 0.034 | 98% |

TABLE 6

Analysis by ICPMS

| Starting Solution, Iodine as Iodate | | | Ending Solution | |
|---|---|---|---|---|
| Iodine, nominal ppm | Iodine, measured ppm | Treatment | Iodine, measured ppm | % Removal |
| 10.00 | [10.00] | M-A_mod-p + A532E | 0.006 | 100% |
| 1.01 | 1.00 | M-A_mod-p + A532E | 0.018 | 98% |
| 1.00 | 1.03 | M-A_mod-p + A532E | 0.019 | 98% |
| 1.00 | 1.03 | M-A_mod-p | 0.110 | 89% |
| 0.18 | 0.19 | M-A_mod-p + A532E | 0.012 | 94% |

Another test was carried out with 10 ml of Solution 1 spiked with the converted radioactive iodate solutions to achieve a total nominal iodine concentration of about 10 ppb and a nominal activity of about 0.5 µCi/ml. Approximately 0.06 grams of the modified MARATHON A resin weighed after placing on a paper filter and air drying (M-A_mod-d) was added to the spiked Solution 1 sample and the sample was tumbled end-over-end for one hour. For comparison purposes, two control tests were also performed, one using a Solution 1 sample spiked with 10 ppb/0.5 µCi/ml iodate and 0.1 grams of the unmodified MARATON A resin, and the other using a Solution 1 sample spiked with 10 ppb/0.5 µCi/ml iodide and 0.1 grams of the unmodified MARA-THON A resin. The comparison tests were performed to demonstrate that the iodine in the spiked Solution 1 used for the test with the modified resin was present in the form of iodate. The unmodified MARATHON A resin was used instead of the Purolite® A532E resin for the iodate verification because it has greater selectivity for iodide, which was particularly useful at the low iodine concentrations of these tests (10 ppb). The tests in this example were evaluated by comparing the $^{123}$I activity levels in solution measured by gamma spectroscopy before and after the resin treatments. The results showed that when the unmodified resin was used, about 35% of the radio-activity was removed when the iodine was present as iodate. In comparison, more than 80% of the radio-activity was removed by unmodified resin when the iodine was present as iodide. When the modified resin was used with the iodate-containing solution, more than 80% of the activity was removed, comparable to the performance of the unmodified resin in iodide removal, as shown in Table 7.

TABLE 7

Analysis by Gamma Spectroscopy

| Starting Solution, Iodine as Iodate | | | Ending Solution | |
|---|---|---|---|---|
| Iodine, ppb | $^{123}$I, uCi/ml | Treatment | $^{123}$I uCi/ml | % Removal |
| 10 | 0.53 | M-A_mod-d | 0.095 | 82% |
| 10 | 0.53 | M-A | 0.337 | 36% |
| 10 | 0.53 | M-A | 0.066 | 87% |

This example verified that substantial removal of iodate, present as a mixture of non-radioactive iodate and radioactive iodate, can be effectively achieved by the single-step method described in this invention using either: (i) an anion resin with pendant thiol functional groups that reduce iodate to iodide and ion exchange sites for the removal of iodide by ion exchange, or (ii) a mixed bed composed of an anion resin with pendant thiol functional groups that reduce iodate to iodide and another anion resin that can remove iodide by ion exchange.

Example 5

Verification of the Iodine Removal Method from Seawater

This example verified the effectiveness of the methods for iodate removal described in the present disclosure when the iodate is present in seawater. Carolina® Seawater obtained from Carolina Biological Supply Company was used to perform the tests in this example. Iodate was added to the seawater as sodium iodate to achieve an iodine concentration of 5 ppm corresponding to approximately $4 \times 10^{-5}$ moles of iodate per litre of seawater. Both methods for iodate removal described in the present disclosure were verified in this example. For tests using the two-step method, 10 ml samples of sea water spiked with iodate was first treated either with L-cysteine to reduce iodate to iodide and then with 0.1 grams of Purolite® A532E for 1 hour with end-over-end tumbling to remove the iodide from solution. For tests using the single-step method, 10 ml samples of sea water spiked with iodate to achieve an iodine concentration of 5 ppm corresponding to approximately $4 \times 10^{-5}$ moles of iodate per litre of seawater was treated with end-over-end tumbling for 1 hour with approximately 0.13 grams of the modified MARATHON A resin weighed without drying (M-A_mod) prepared as in Example 2 followed by end-over-end tumbling for another hour after adding 0.1 grams of Purolite® A532E. The percentage of iodate removed from sea water was about 60% when the two-step method was used and greater than 90% when the single-step method was used. The tests results are shown in Table 8.

TABLE 8

Analysis by ICPMS

| Starting Solution, Iodine as Iodate | | Ending Solution | |
|---|---|---|---|
| Iodine, nominal ppm | Treatment | Iodine, measured ppm | % Removal |
| 5 | Cysteine + A532E | 2.01 | 60% |
| 5 | M-A_mod + A532E | 0.32 | 94% |

This example verified that substantial removal of iodate present in sea water can be effectively accomplished by either the two-step method or the single-step method described in the present disclosure, both of which involve reduction of iodate to iodide by thiol chemical groups followed by removal of iodide by ion exchange.

Example 6

Verification of the Iodine Removal Method from Ground Water

This example verified the effectiveness of the methods for iodate removal described in the present disclosure when the iodate is present in ground water. The ground water selected for these tests is of relevance to the U.S. Yucca Mountain high level nuclear waste repository. The solution used for these tests was a simulant of EJ-13, a ground water preparation made using groundwater from the USGS J-13 well that was treated by equilibrating at 90° C. in contact with crushed Topopah Spring Tuff rock from the Yucca Mountain site. Iodate was added to the EJ-13 simulant as sodium iodate to achieve an iodine concentration of 5 ppm corresponding to approximately $4 \times 10^{-5}$ moles of iodate per litre of EJ-13 solution. Similar to in Example 5, both two-step and one-step methods for iodate removal described in the present disclosure were used in this example. For tests using the two-step method, 10 ml samples of EJ-13 simulant spiked with iodate was first treated with L-cysteine to reduce iodate to iodide and then with 0.1 grams of Purolite® A532E for 1 hour with end-over-end tumbling to remove the iodide from solution. For tests using the single-step method, 10 ml samples of EJ-13 simulant spiked with iodate was treated with end-over-end tumbling for 1 hour with approximately 0.13 grams of the modified MARATHON A resin prepared as in Example 2 and weighed without drying (M-A_mod), followed by one more hour after adding 0.1 grams of Purolite® A532E. The iodate removal rate from the EJ-13 simulant was about 80% when the two-step method was used and greater than 95% when the single-step method was used, as shown in Table 9.

TABLE 9

Analysis by ICPMS

| Starting Solution, Iodine as Iodate | | Ending Solution | |
|---|---|---|---|
| Iodine, nominal ppm | Treatment | Iodine, measured ppm | % Removal |
| 5 | Cysteine + A532E | 0.87 | 83% |
| 5 | M-A_mod + A532E | 0.10 | 98% |

This example verified that substantial removal of iodate present ground water solutions can be effectively accomplished by either the two-step method or the single-step method described in this invention both of which involve reduction of iodate to iodide by thiol chemical groups followed by removal of iodide by ion exchange.

It is intended that the invention not be limited to the particular embodiment disclosed herein contemplated for carrying out this invention, but that the invention will include all embodiments falling within the scope of the claims.

All documents, patents, journal articles and other materials cited in the present application are incorporated herein by reference.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A system comprising:
    a substrate to which a thiol group containing compound is attached to the substrate; and
    an aqueous solution,
    wherein the substrate is disposed in the aqueous solution, the aqueous solution being reactable with the substrate,
    wherein the aqueous solution comprises a radioactive iodine species, wherein the aqueous solution has a pH range of 2 to 10.5, and
    wherein the thiol group containing compound is at least one selected from the group consisting of L-cysteine enantiomer, DL-cysteine racemic mixture, thioglutathione or at least one thioglycolate selected from the group consisting of sodium thioglycolate and thioglycolic acid.

2. The system of claim 1, wherein the substrate is an ion exchange material.

3. The system of claim 1 wherein the substrate is an anion ion exchange material that absorbs iodide.

4. The system of claim 1, wherein the substrate is a styrene- divinyl benzene ion exchange resin.

5. The system of claim 1, wherein the substrate is aluminium oxide.

6. The system of claim 1, wherein the substrate is silicon oxide.

7. The system of claim 1, wherein the system is produced by contacting the substrate with the aqueous solution comprising the radioactive iodine species of the thiol group containing compound followed by rinsing.

8. The system of claim 1, wherein the system is produced by contacting MARATHON A ion exchange resin or AmberLite HPR4800 OH ion exchange resin with the aqueous solution comprising the radioactive iodine species the thiol group, followed by rinsing.

9. A method of treating iodate in aqueous liquids comprising contacting the aqueous liquids with the system of claim 1, wherein the system converts the iodate in the aqueous liquids to an iodide and then the iodide is removed from the aqueous liquids.

10. A method of treating iodate in aqueous liquids comprising contacting the aqueous liquids with a mixed bed comprising: (i) the system of claim 1; and (ii) a media capable of removing iodide by sorption or ion exchange, wherein the system converts the iodate in the aqueous liquids to an iodide and then the iodide is removed from the aqueous liquids.

11. A method of treating iodate in aqueous liquids comprising contacting the aqueous liquids with a first bed comprising the system of claim 1 and then contacting the aqueous liquids with a second bed comprising a media capable of removing iodide by sorption or ion exchange, wherein the system converts the iodate in the aqueous liquids to an iodide and then the iodide is removed from the aqueous liquids.

12. The system of claim 1, wherein the system converts an iodate in an aqueous solution to an iodide.

13. The system of claim 1, wherein the substrate converts an iodate in an aqueous solution to an iodide.

* * * * *